United States Patent [19]
Barnes-Moss

[11] 3,842,938
[45] Oct. 22, 1974

[54] PISTON COOLING AND/OR SMALL-END BEARING LUBRICATION ARRANGEMENT FOR I.C. ENGINES

[75] Inventor: Howard William Barnes-Moss, Brighton, England

[73] Assignee: Richardo & Co., Engineers (1927) Limited, Shoreham-by-Sea, Sussex, England

[22] Filed: Dec. 29, 1972

[21] Appl. No.: 319,478

[30] Foreign Application Priority Data
Dec. 30, 1971 Great Britain.................... 60852/71

[52] U.S. Cl.................................. 184/6.5, 74/605
[51] Int. Cl....... F01m 1/00, F16c 1/24, F16c 33/00
[58] Field of Search................. 184/6.5; 123/196 R; 74/605; 308/78

[56] References Cited
UNITED STATES PATENTS

| | | | |
|---|---|---|---|
| 2,199,699 | 5/1940 | Frelin................................. | 184/6.5 |
| 2,894,414 | 7/1959 | Johnson.......................... | 74/605 X |
| 3,069,926 | 12/1962 | Hoffman et al.................. | 184/6.5 X |
| 3,495,685 | 2/1970 | Rinsum.............................. | 184/6.5 |
| 3,785,459 | 1/1974 | Patchen............................ | 184/6.5 |

FOREIGN PATENTS OR APPLICATIONS

| | | | |
|---|---|---|---|
| 26,325 | 7/1965 | Japan................................ | 184/6.5 |
| 1,903,049 | 1/1969 | Germany........................... | 184/6.5 |

*Primary Examiner*—Manuel A. Antonakas
*Attorney, Agent, or Firm*—Cushman, Darby & Cushman

[57] ABSTRACT

In a piston-type internal combustion engine, each crankpin has a main lubrication hole in the lower half of the crankpin surface and an auxiliary lubrication hole in the leading quadrant of the crankpin surface ahead of the top-dead-centre point and axially offset with the main hole, both holes communicating with the pressurized lubrication system. The main hole communicates cyclically with a part-circumferential groove formed mainly or wholly in the lower half-shell of the associated big-end bearing and leading to a longitudinal lubricant passage in the connecting rod.

5 Claims, 3 Drawing Figures

3,842,938

PISTON COOLING AND/OR SMALL-END BEARING LUBRICATION ARRANGEMENT FOR I.C. ENGINES

This invention relates to internal combustion engines of piston type, in which oil is supplied from the pressure lubrication system of the crankshaft through a longitudinal passage in the or each connecting rod leading from the associated big end bearing to the small-end of the connecting rod for piston cooling and/or piston pin lubrication.

It has been shown that when oil for piston cooling is supplied through the big-end bearing and through a longitudinal drilling in the connecting rod, it is advantageous to restrict the supply period to a crank angle extending approximately 90° on each side of the top-dead-centre position of the crankpin. This is done by utilising the big-end bearing assembly as a rotary valve for limiting the oil flow to the connecting rod drilling to the period when the inertia of the reciprocating components is acting in a sense favourable for oil feed to the piston.

It is also well established that when the or each big-end bearing is lubricated through a single feed passage in the crank, the location of the lubrication hole, i.e., the exit hole of the feed passage in the crankpin surface, should lie in the leading quadrant of the crankpin surface ahead of the top-dead-centre point, an angle of about 45° before top-dead-centre being considered optimum. In this context, the expression "the top-dead-centre point" is used herein to mean the point on the crankpin surface intersected by a straight line joining the crankshaft axis of rotation and the gudgeon pin centre line when the piston is at its top-dead-centre position (sometimes alternatively called its inner-dead-centre position).

If an attempt is made to use a lubrication hole positioned as described ahead of the top-dead-centre point of the crankpin surface to provide the oil with the desired timing for piston cooling, as well as providing lubrication of the big-end bearing, the upper half bearing must be grooved over the greater part or the whole of its circumferential length. This results in a significant loss of bearing area in the upper half bearing, with a consequent reduction in the load capacity of the big-end bearing.

An object of the present invention is to provide a timed feed of oil for piston cooling, and/or for small-end bearing lubrication, using lubricant supplied from the crankshaft lubrication system, but without any significant loss of area of the upper half of the bearing.

According to the present invention, the connecting rod associated with the or each piston is formed with a longitudinal supply passage for supplying oil under pressure derived from the crankshaft lubrication system to the small-end of the connecting rod, for example for piston cooling purposes, and a big-end feed passage formed in the crankshaft and connected to the crankshaft lubrication system for supplying pressurised lubricant to the big-end bearing emerges in a lubrication hole which is located in the leading quadrant of the crankpin surface before the top-dead-centre point, as hereinbefore defined, and an auxiliary supply passage formed in the crankpin and connected to the crankshaft lubrication system emerges in an auxiliary hole located in the lower half of the crankpin surface (i.e., the half-side remote from the top-dead-centre point), the auxiliary hole communicating with the supply passage in the connecting rod via a part-circumferential groove formed wholly or mainly in the lower half bearing, the auxiliary hole and the cooperating bearing groove both being axially offset to one side of the lubrication hole so that the groove does not communicate with the latter during the cycle. The groove feeds the longitudinal passage in the connecting rod through suitable interconnecting holes or passages.

The auxiliary supply passage in the crankpin may be formed as a branch passage leading off the big-end feed passage to the auxiliary hole, or it may comprise a separate drilling or drillings in the crankshaft leading directly from an adjacent main journal.

The invention may be carried into practice in various ways, but two specific embodiments will now be described by way of example only and with reference to the accompanying drawings, in which.

Figures 1, 2:
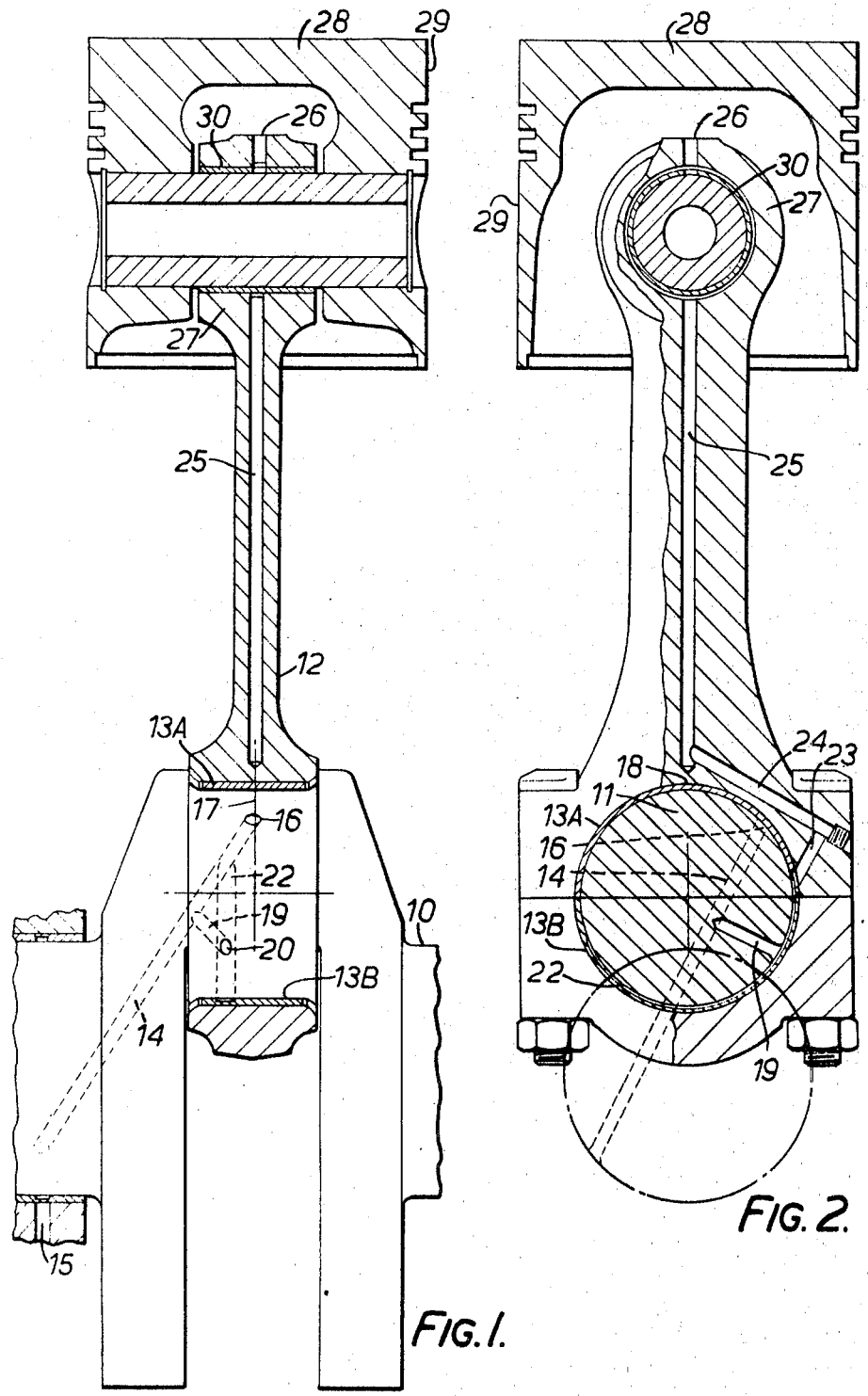
FIG. 1 is a side elevation, partly in section, of one crank of the crankshaft of an I.C. engine, and the big-end bearing of the associated connecting rod, shown in the top-dead-centre position.
FIG. 2 is a view in section on the line A—A of FIG. 1.

In the embodiment illustrated in FIGS. 1 and 2, the crankshaft 10 has a crankpin 11 on which the big-end of a connecting rod 12 is journalled by means of a big-end bearing having upper and lower half bearing shells respectively shown at 13A and 13B. A feed passage 14 is drilled in the crankshaft 10 to communicate at one end with the main oil supply groove 15 in the adjacent main journal bearing of the crankshaft, and emerges at its other end in a lubrication feed hole 16 located on the radial plane of symmetry 17 of the crankpin, as shown in FIG. 1, to lubricate the big-end bearing, the hole 16 lying in the quadrant of the crankpin surface which lies ahead of the top-dead-centre point 18 of the crankpin surface, the hole 16 being at an angular displacement of approximately 45° therefrom, as shown in FIG. 2.

An auxiliary passage 19 is drilled in the crankpin 11 as a branch passage whose inner end intersects the big-end feed passage 14, whilst the outer end of the auxiliary passage 19 emerges in an auxiliary hole 20 located in the crankpin surface at a point in its underside, i.e., the side remote from the top-dead-centre point 18. A part-circumferential groove 22 is formed in the big-end bearing, the greater part of the length of the groove 22 extending in the inner surface of the lower bearing shell 13B whilst a small portion only at one end of the groove lies in the upper bearing shell 13A, as shown in FIG. 2. This groove 22 overlies the auxiliary hole 20 so as to receive oil delivered through the auxiliary passage 19 from the main big-end feed passage 14.

The end portion of the groove 22 which lies in the upper bearing shell 13A communicates through drillings 23 and 24 with a drilling 25 formed longitudinally in the connecting rod to supply piston cooling oil to a discharge port 26 in the small end 27 of the connecting rod adjacent to the piston crown 28, or to a recess in the piston 29 itself, and/or to supply lubricating oil to the small-end bearing 30 and piston 29.

As shown in FIG. 1, the auxiliary hole 20 and the bearing groove 22 are both offset to one side of the plane of symmetry 17 of the crankpin and big-end bearing, so that the groove 22 does not communicate with the main lubrication hole 16 at any time during the rotation of the crank.

Figure 3:
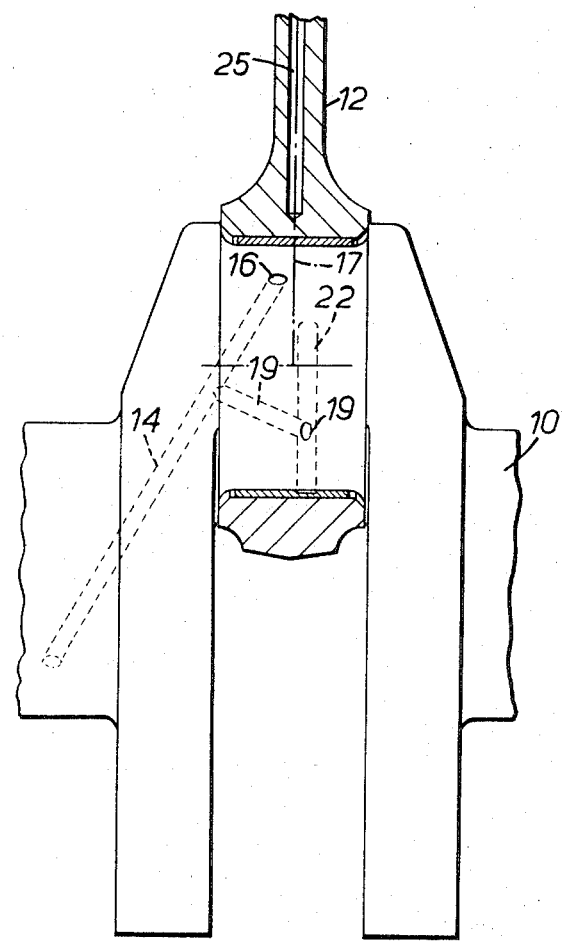
FIG. 3 is a view similar to FIG. 1 of a modified arrangement.

In the modified embodiment shown in FIG. 3, the main lubrication hole 16 is offset to one side of the plane of symmetry 17, whilst the auxiliary hole 20 and the bearing groove 22 are offset on the other side of the plane 17, so that once again the groove 22 does not communicate at any time with the lubrication hole 16 for big-end bearing lubrication.

Both the embodiments illustrated are examples of a connecting rod having two bolts for securing the big-end assembly. The invention is however equally applicable to four-bolt connecting rods, the various drillings and passages being appropriately adjusted to suit the four-bolt configuration.

Moreover whilst in both illustrated embodiments the auxiliary passage 19 which supplies oil to the auxiliary hole 20 is formed as a branch passage leading off the main big-end feed passage 14, it will be understood that the auxiliary hole could be fed from an auxiliary passage separate from the feed passage 14 and afforded by suitable drillings extending directly from an adjacent main journal of the crankshaft.

What I claim as my invention and desire to secure by Letters Patent is:

1. In an internal combustion engine of the piston type and including a piston reciprocable in a cylinder, a rotary crankshaft having an oil passage therein, a crank with a crankpin formed as a part of the crankshaft, a connecting rod having a big end and a small end, a big-end bearing by which the big end of the connecting rod is journalled on the crankpin, the big-end bearing having upper and lower half-cylindrical bearing shells carried by the big end of the connecting rod, a small-end bearing by which the small end of the connecting rod is pivotally connected to the piston, a lubrication system comprising a pressurized oil supply for supplying pressurized oil to the oil passage in the crankshaft, a longitudinal oil supply passage formed lengthwise in the connecting rod and extending between its ends, a big-end oil feed passage formed in the crank and crankpin and communicating with the oil passage in the crankshaft, the big-end oil feed passage terminating in a big-end bearing lubrication hole located in the leading quadrant of the crankpin surface ahead of its top-dead-center point, an auxiliary oil supply passage formed in the crankpin and also communicating with the oil passage in the crankshaft, said auxiliary oil supply passage terminating in an auxiliary lubrication hole located in the crankpin surface in its half-side remote from the top-dead-center point of the crankpin, said big-end bearing having an internal part-circumferential groove formed therein, the greater part of the length of the groove formed in the big-end bearing being formed in the bearing surface of the lower bearing shell remote from the piston, the auxiliary lubrication hole being in alignment with the groove so as to open into the groove during a part of each complete cycle of rotation of the crankshaft, and the groove communicating with the end of the connecting rod longitudinal oil supply passage remote from the piston, the auxiliary lubrication hole and groove being offset to one side of the big-end bearing lubrication hole in the direction of the axis of the crankpin whereby communication between the groove and the big-end bearing lubrication hole is prevented throughout the cycle of rotation of the crankshaft.

2. A lubrication system as claimed in claim 1 in which the auxiliary supply passage comprises a branch passage leading off the big-end feed passage to the auxiliary hole.

3. A lubrication system as claimed in claim 1 in which the crankshaft is journalled in main bearings, and in which the auxiliary supply passage comprises a drilling separate from the big-end feed passage and leading directly from an adjacent main bearing to the auxiliary hole.

4. A lubrication system as claimed in claim 1 in which the small end of the connecting rod has discharge ports communicating with the longitudinal supply passage in the connecting rod whereby oil delivered through the longitudinal supply passage is discharged through the discharge ports as cooling oil for the piston.

5. A lubrication system as claimed in claim 1 in which the longitudinal supply passage in the connecting rod communicates with the small-end bearing to supply oil under pressure thereto for lubricating the small-end bearing.

* * * * *